UNITED STATES PATENT OFFICE.

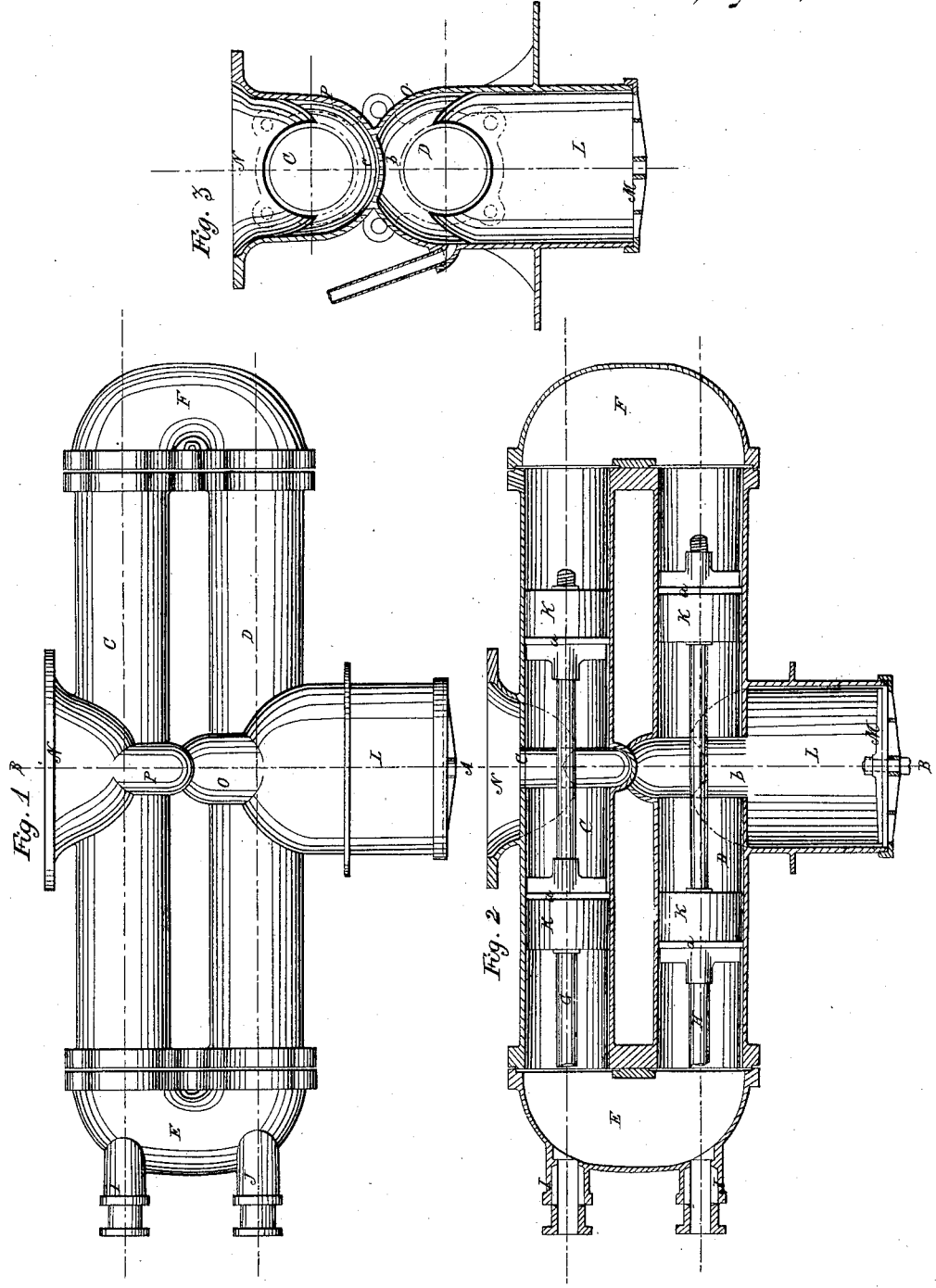

ROBERT POOLE, OF BALTIMORE, MARYLAND, ASSIGNOR TO HIMSELF AND GERMAN H. HUNT, OF SAME PLACE.

FORCING-PUMP.

Specification of Letters Patent No. 25,366, dated September 6, 1859.

*To all whom it may concern:*

Be it known that I, ROBERT POOLE, of Baltimore, in the county of Baltimore and State of Maryland, have invented certain new and useful Improvements in Forcing-Pumps; and I do hereby declare the following to be a full, clear, and exact description of the same, reference being had to the accompanying drawings, making a part of this specification, in which—

Figure 1, represents a side view of the pump cylinders. Fig. 2, represents a longitudinal section through the same. Fig. 3, represents a cross section through the red line of Figs. 1 and 2, at A, B.

Similar letters of reference where they occur in the several figures denote like parts of the pump in all of them.

My improvement consists in the manner in which I enlarge the inlet and exit openings where they connect with the pump cylinders, so as to make said openings of greater area than the area of the pump cylinders—the object being to prevent the throttling of the water, and thus relieve the pump, which increases its working capacity in a corresponding ratio.

To enable others skilled in the art to make and use my invention, I will proceed to describe the same with reference to the drawings.

C, D, represent two parallel pump cylinders, connected at their ends by circular heads E, F, one of which if found essential may be cast solid with the pump cylinders the other being separate therefrom for the purpose of boring out the interior of the cylinders.

The piston rods G, H, work through suitable stuffing boxes I, J, on the head E, and said rods are connected to, and worked by one cross head, to which the prime motor is attached.

The head or heads may be connected to the pump cylinders by flanges on each, with packing between them, and held together by screw bolts, in any of the usual well known ways.

K, represents the piston-heads, and a, a, a, a, the valves thereon. These pistons, or plungers, may be of the kind for which I am about to apply for Letters Patent, or any other kind suitable for the purpose.

L, is the inlet pipe, it being provided with a foot or check valve M. And N, the exit, or pipe to which the air chamber is attached, in the usual way. Where these two passages unite with the pump cylinders, the cylinders may be said to be cut in two, or an opening made through their shells—as at b, c Fig. 2, over and around which openings are the swelled portions O, P, which connect, and unite said divided portions, thus forming the pump cylinders into one united whole, but with greatly enlarged areas at these points—so that the inlet and exit, to, and from, the pump cylinders are much larger in area, than the areas of the cylinders themselves to which, and of which, they are a part—the whole being cast in one entire piece. These enlarged passages causes the pump to work perfectly free and easy, without any thumping or pounding, as the column of water is not checked at any one point but on the contrary, it is relieved at the very points where it has the greatest tendency to throttle or become sluggish.

Having thus fully described the nature and object of my invention, what I claim therein as new and desire to secure by Letters Patent is,

Enlarging the areas of the inlet and exit openings where they connect with the pump cylinders, by means of the swells O, P, substantially in the manner, and for the purpose set forth.

ROBT. POOLE.

Witnesses:
JOHN A. TYLER,
JAMES MAUGHLIN.